US008286773B2

(12) United States Patent
Nakamura et al.

(10) Patent No.: US 8,286,773 B2
(45) Date of Patent: Oct. 16, 2012

(54) FRICTIONAL ENGAGEMENT APPARATUS

(75) Inventors: Kazuaki Nakamura, Toyota (JP);
Toshimitsu Sato, Toyota (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 567 days.

(21) Appl. No.: 12/540,666

(22) Filed: Aug. 13, 2009

(65) Prior Publication Data

US 2010/0044179 A1 Feb. 25, 2010

(30) Foreign Application Priority Data

Aug. 19, 2008 (JP) ................. 2008-210769

(51) Int. Cl.
*F16D 13/64* (2006.01)
*F16D 13/72* (2006.01)

(52) U.S. Cl. ............ 192/70.12; 192/70.14; 192/85.43; 192/58.61; 192/113.36

(58) Field of Classification Search .............. 192/52.3, 192/70.14, 85.43, 85.61
See application file for complete search history.

(56) References Cited

U.S. PATENT DOCUMENTS

| 6,135,256 | A | 10/2000 | Han et al. |
| 6,644,453 | B2 * | 11/2003 | Kremer ............ 192/107 C |
| 6,910,561 | B2 * | 6/2005 | Sasse ................. 192/70.12 |
| 7,806,245 | B2 * | 10/2010 | Oh ...................... 192/70.12 |

FOREIGN PATENT DOCUMENTS

| JP | 0352429 A | 5/1991 |
| JP | 0352429 U | 5/1991 |
| JP | 0637630 A | 5/1994 |
| JP | 0637630 U | 5/1994 |
| JP | 7224869 A | 8/1995 |
| JP | 7229523 A | 8/1995 |
| JP | 08200389 A | 8/1996 |
| JP | 09257058 A | 9/1997 |
| JP | 10169681 A | 6/1998 |
| JP | 2001234947 A | 8/2001 |

* cited by examiner

*Primary Examiner* — Richard M. Lorence
(74) *Attorney, Agent, or Firm* — Gifford, Krass, Sprinkle, Anderson & Citkowski, P.C.

(57) ABSTRACT

In a frictional engagement apparatus that includes a clutch drum, separator plates, a clutch hub, and friction plates, a plurality of concave portions that dip inward in the plate thickness direction and a plurality of convex portions that protrude outward in the plate thickness direction are formed on an edge of the separator plates and/or a an edge of the friction plates, with each convex portion being arranged between two adjacent concave portions. Ridge lines of the concave portions and the convex portions pass through positions away from a center point of the separator plates and/or the friction plates.

8 Claims, 12 Drawing Sheets

FRICTIONAL ENGAGEMENT APPARATUS

INCORPORATION BY REFERENCE

The disclosure of Japanese Patent Application No. 2008-210769 filed on Aug. 19, 2008 including the specification, drawings and abstract is incorporated herein by reference in its entirety.

BACKGROUND OF THE INVENTION

1. Field of the Invention

The invention relates to a frictional engagement apparatus formed of a wet multiple disc clutch of a vehicular automatic transmission for example. More particularly, the invention relates to a frictional engagement apparatus that reduces drag torque generated when the clutch is not engaged.

2. Description of the Related Art

A wet multiple disc clutch typically includes a cylindrical clutch drum, a plurality of separator plates that are spline-engaged to the inner peripheral portion of the clutch drum, a clutch hub that is arranged radially inward of the clutch drum, and a plurality of friction plates that are spline-engaged to the outer peripheral portion of the clutch hub. The plurality of separator plates and the plurality of friction plates are alternately arranged in the axial direction. Lubricating oil is supplied to the plates so that they engage smoothly. The lubricating oil lubricates and cools the plates. However, when the plates are not engaged and one set of plates is rotating, shearing force is generated in the lubricating oil flowing between the separator plates and the friction plates. As a result, the non-rotating plates create drag on the rotating plates, creating rotational resistance. That is, drag torque is generated by the lubricating oil. This kind of drag torque reduces fuel efficiency, so attempts are being made to improve the structure to suppress this drag torque.

Japanese Patent Application Publication No. 10-169681 (JP-A-10-169681), for example, describes a frictional engagement apparatus that suppresses this kind of drag torque. The described apparatus includes a disc with internal teeth and a disc with external teeth, and friction material affixed to one side of either one of the discs in the axial direction. A groove that communicates the inner diameter portion with the outer diameter portion and which is inclined in the rotational direction of the disc with the internal teeth is formed in the friction material affixed to the disc with the external teeth, while a groove that is not inclined is formed in the friction material that is affixed to the disc with the internal teeth. In the frictional engagement apparatus, the disc with the internal teeth is engaged with the disc with the external teeth in such a manner that the side face of the friction material with the inclined groove faces the side face of the friction material with the non-inclined groove. With this structure, when the disc with the internal teeth and the disc with the external teeth are not engaged and the disc with the internal teeth is rotating faster than the disc with the external teeth, lubricating oil is forced out of both the inclined groove in the disc with the external teeth and the non-inclined groove in the disc with the internal teeth, thereby reducing the amount of lubricating oil on the friction surface of the disc with the external teeth, which in turn inhibits drag torque from increasing.

Also, Japanese Patent Application Publication No. 2001-234947 (JP-A-2001-234947), for example, describes a related frictional engagement apparatus that also suppresses this kind of drag torque. This apparatus includes a disc with external teeth that is spline-engaged to an outer member, and a disc with internal teeth that is spline-engaged to an inner member. The disc with the external teeth and the disc with the internal teeth are pressed against one another in the plate thickness direction such that the two discs are frictionally engaged. One of the discs, either the disc with the external teeth or the disc with the internal teeth, is formed by an undulating disc that is curved in a wave shape in the plate thickness direction, with the circumferential direction as the wavelength direction. At the initial stage of engagement in this frictional engagement apparatus, the mountain and valley portions of the waves elastically deform while the wave disc presses against the other disc. The buffering action from the elastic deformation of the mountain and valley portions prevents a rapid increase in torque, and also absorbs engagement shock. Also, during engagement and disengagement, the wave disc is quickly moved away from the other disc by the elastic restoring force of the mountain and valley portions, thereby suppressing drag torque from the lubricating oil.

However, with the frictional engagement apparatus described in JP-A-10-169681, power is transmitted by engaging the flat engagement surface of the friction material of the disc on which the internal teeth are formed with the flat engagement surface of the friction material of the disc on which the external teeth are formed. Therefore, the groove width is relatively small so the amount of lubricating oil that is discharged along this groove is small. As a result, if the disc with the internal teeth is not engaged with the disc with the external teeth, a relatively large amount of drag torque is generated by the lubricating oil in the gap between the two discs, and this drag torque is unable to be sufficiently suppressed. Also, if the disc with the internal teeth is not engaged with the disc with the external teeth and the relative rotational speed between those discs is high, lubricating oil is not easily discharged from the narrow groove in the friction material. As a result, neither the suppression of drag torque, not cooling from the lubricating oil, is promoted.

Also, with the frictional engagement apparatus described in JP-A-2001-234947, the wave-shaped concave and convex portions that are curved in the plate thickness direction with the circumferential direction as the wavelength direction are formed on either the disc with the external teeth or the disc with the internal teeth, and the ridge lines of the concave and convex portions are radially formed so as to pass through the center point of the disc. Therefore, when the disc with the internal teeth is not engaged with the disc with the external teeth and the relative rotational speed between those discs is low, drag torque is generated by lubricating oil in a gap between the disc with the internal teeth and the disc with the external teeth, which is defined by the concave and convex portions, even though that lubricating oil flows to the outer portion from that gap. Accordingly, drag torque cannot be sufficiently suppressed. Also, if the disc with the internal teeth is not engaged with the disc with the external teeth and the relative rotational speed between the discs is high, lubricating oil that flows through the gap between the disc with internal teeth and the disc with external teeth ends up colliding with the side wall surface because the ridge lines of the concave and convex portions are radially formed so that they pass through the center point of the disc with the external teeth or the disc with the internal teeth. This impedes the discharge of lubricating oil, so cooling is not promoted.

SUMMARY OF THE INVENTION

The invention thus provides a frictional engagement apparatus that reduces drag torque generated by lubricating oil in a gap between a friction member and an engagement member, over a wide range from a low relative rotation speed between the friction member and the engagement member to a high relative rotation speed between the friction member and the engagement member when these members are not engaged.

A first aspect of the invention relates to a frictional engagement apparatus that includes an outer cylindrical member, an inner cylindrical member, a plurality of outer engagement members, and a plurality of inner engagement members. The outer cylindrical member has an open end portion that is open at one axial end and an inner peripheral portion on which splines are formed. The inner cylindrical member has an outer peripheral portion which is arranged to the inside in the radial direction of the outer cylindrical member and is coaxial with the outer cylindrical member, and on which splines are formed facing the inner peripheral portion of the outer cylindrical member. Each of the outer engagement members has an outer peripheral portion which spline-engages with the inner peripheral portion of the outer cylindrical member so as to be able to move in the axial direction with respect to the outer cylindrical member and rotate together with the outer cylindrical member. Each of the inner engagement members has an inner peripheral portion that spline-engages with the outer peripheral portion of the inner cylindrical member so as to be able to move in the axial direction with respect to the inner cylindrical member and rotate together with the inner cylindrical member. The inner engagement members are arranged alternately with the outer engagement members and on the same axis as the outer engagement members. Each inner engagement member frictionally engages with the outer engagement members adjacent thereto. Moreover, an edge of each of the outer engagement members and/or each of the inner engagement members has a plurality of concave portions that dip inward in the plate thickness direction and a plurality of convex portions that protrude outward in the plate thickness direction, each convex portion is arranged between two adjacent concave portions. Ridge lines of the concave portions and the convex portions pass through positions away from a center point of each of the outer engagement members and/or each of the inner engagement members.

According to this frictional engagement apparatus, when the lubricating oil that flows in between the outer engagement members and the inner engagement members collides with the sloped edges of the convex portions, the oil pools in the gaps between the outer engagement members and the inner engagement members, and lubricating oil flows in the plate thickness direction of the outer engagement members which is orthogonal to the direction the direction in which the lubricating oil flows. The flow force of the lubricating oil in the plate thickness direction acts in a direction that peels the inner engagement members away from the outer engagement members. This peeling action reduces the drag torque generated between the outer engagement members and the inner engagement members. In particular, when the relative rotation between the outer engagement members and the inner engagement members is low speed rotation, lubricating oil tends to collide with the sloped edges of the convex portions so the peeling effect of the flow force of the lubricating oil in the plate thickness direction is relatively large.

Also, the gaps through which the lubricating oil flows are defined by the concave portions and the convex portions, and the concave portions and the convex portions are formed so that the ridge lines of the concave portions and the ridge lines of the convex portions pass through positions away from the center points of the outer engagement members and/or the inner engagement members. Therefore, the gaps are relatively large compared with the gaps in the related art so the lubricating oil easily flows through these gaps and out of the outer cylindrical member. As a result, drag torque generated between the outer engagement members and the inner engagement members is reduced.

On the other hand, when the relative rotation between the outer engagement members and the inner engagement members is high speed rotation, lubricating oil that has flowed into the gaps between the outer engagement members and the inner engagement members tends to flow along the concave portions and the convex portions without colliding with the sloped edges of the convex portions as it does in the case of low speed relative rotation as described above. Thus, the lubricating oil flows smoothly in the gaps, thereby reducing drag torque and lubricating oil is better able to flow out from the gaps between the outer engagement members and the inner engagement members. As a result, the outer engagement members and the inner engagement members are able to be well cooled by the lubricating oil, which improves the durability of the inner engagement member.

Also, in the frictional engagement apparatus described above, each of the ridge lines of the concave portions and the convex portions may intersect, at an angle, one of a plurality of radial lines which pass through the center point of the outer engagement member and the inner engagement member and extend radially outward.

When each of the ridge lines of the concave portions and the convex portions intersects, at an angle, one of a plurality of radial lines which pass through the center point of the outer engagement member and the inner engagement member and extend radially outward, the flow force in a direction that peels the inner engagement members away from the outer engagement members from the flow of lubricating oil in the plate thickness direction effectively acts on the gaps between the outer engagement members and the inner engagement members, thereby effectively reducing the drag torque.

Also, in the frictional engagement apparatus described above, the ridge lines of the concave portions and the convex portions may extend generally parallel at predetermined intervals.

According to this structure, when the ridge lines of the concave portions and the convex portions extend generally parallel at predetermined intervals, the flow force in a direction that peels the inner engagement members away from the outer engagement members from the flow of lubricating oil in the plate thickness direction effectively acts on the gaps between the outer engagement members and the inner engagement members, thereby effectively reducing the drag torque. In addition, the concave portions and convex portions are easily formed on the edge of each of the outer engagement members and/or each of the inner engagement members, so the outer engagement members and/or the inner engagement members can be manufactured easily.

Also, in the frictional engagement apparatus described above, the ridge lines of the concave portions and the convex portions may be divided into a first group of ridge lines that is made up of ridge lines which extend generally parallel at predetermined intervals, and a second group of ridge lines that is made up of ridge lines which extend generally parallel at predetermined intervals and are orthogonal to the ridge lines of the first group of ridge lines.

According to this structure, the flow force in a direction that peels the inner engagement members away from the outer engagement members from the flow of lubricating oil in the plate thickness direction effectively acts on the gaps between the outer engagement members and the inner engagement members, thereby effectively reducing the drag torque. In addition, the action of the flow force in the direction that peels the inner engagement members away from the outer engagement members is the same regardless of whether the relative rotation between the outer engagement members and the inner engagement members is in the forward direction or the reverse direction. Therefore, drag torque in the forward direction as well as in the reverse rotation can be reduced.

Accordingly, this invention makes it possible to provide a frictional engagement apparatus that can reduce drag torque generated by lubricating oil in the gap between the friction member and the engagement member over a wide range from a low relative rotation speed between the friction member and the engagement member to a high relative rotation speed between the friction member and the engagement member when these members are not engaged.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
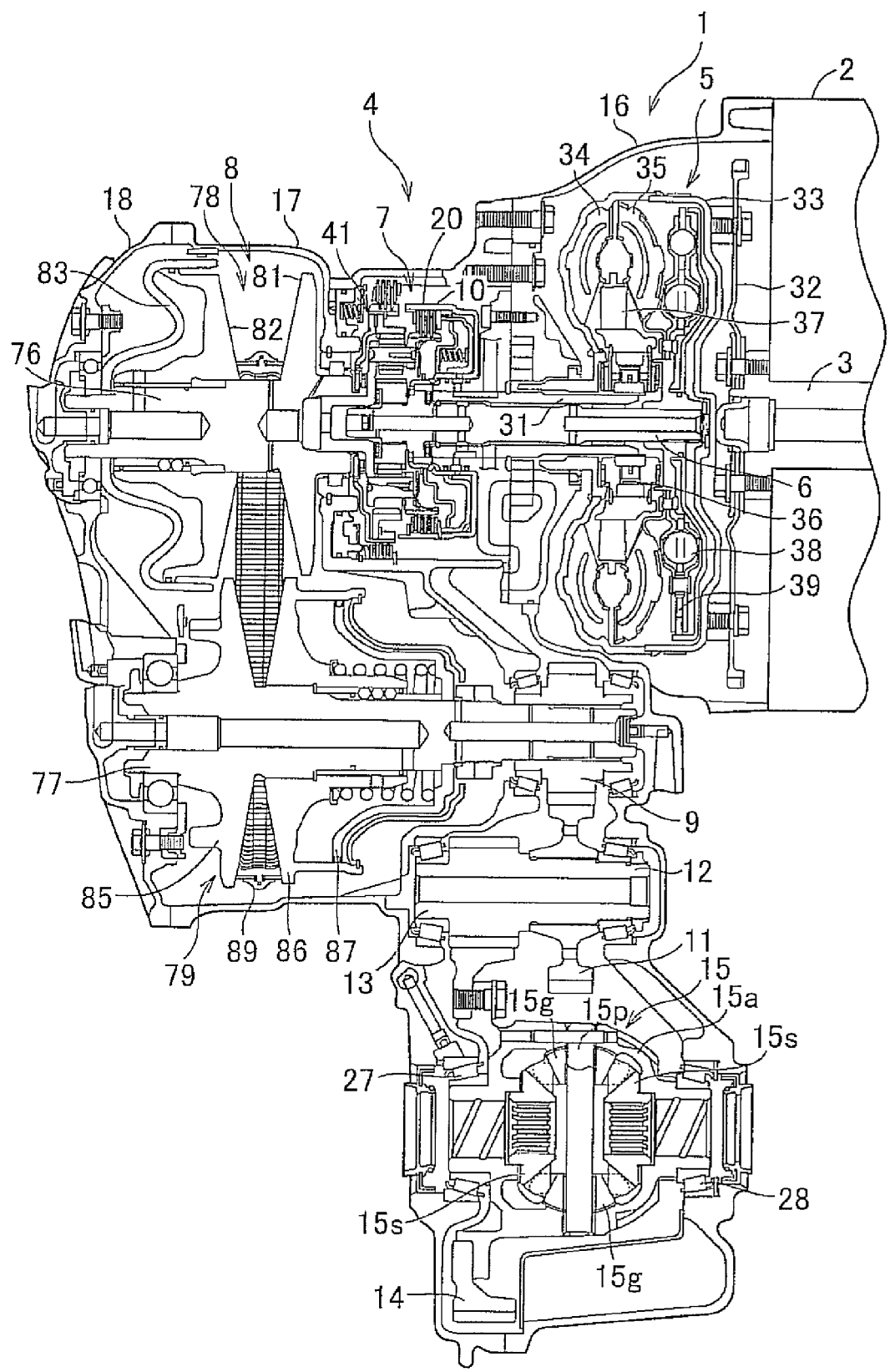
FIG. 1 shows a sectional view of a vehicle transaxle, which is formed by a frictional engagement apparatus according to one example embodiment of the invention.
Figure 2:
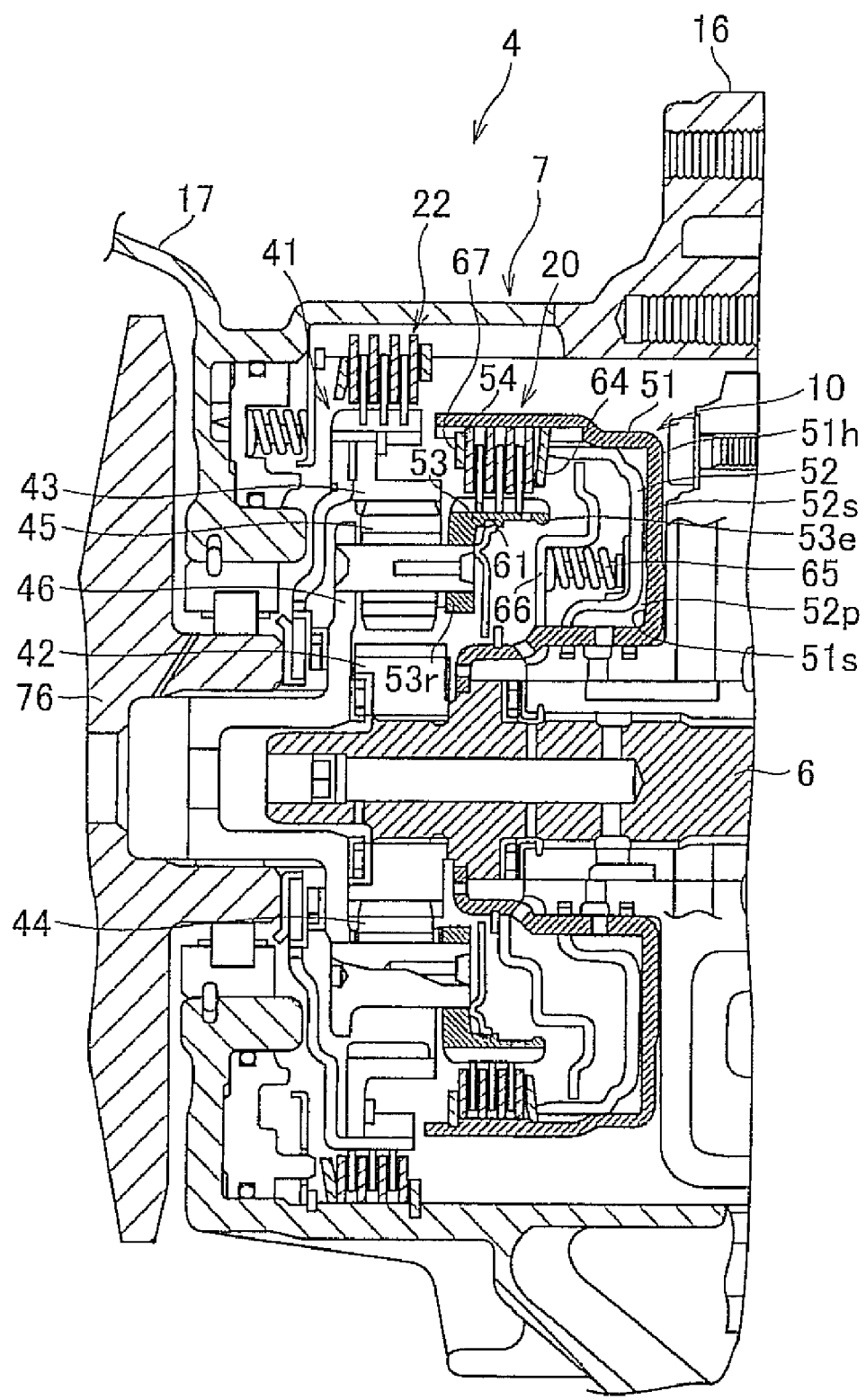
FIG. 2 shows a partial enlarged sectional view of the transaxle shown in FIG. 1.

Example embodiments of the present invention will be described in greater detail below with reference to the accompanying drawings. FIG. 1 shows a sectional view of a transaxle of a vehicle, which is formed by a frictional engagement apparatus according to one example embodiment of the invention, and FIG. 2 shows a partial enlarged sectional view of the transaxle shown in FIG. 1. In this example embodiment, the frictional engagement apparatus of this invention will be described in the context of a forward clutch in a transaxle mounted in a vehicle.

First the structure will be described. A vehicle 1 in this example embodiment is a front wheel drive (FF: front engine, front drive) vehicle and has a transverse mounted engine 2, which, for example, uses gasoline as fuel. Also, the vehicle 1 is provided with a transaxle 4 that is arranged to one side of the engine 2 and is connected to a crankshaft 2, of the engine 3, and an electronic control unit (ECU), not shown, that controls the engine 2 and the transaxle 4.

The transaxle 4 includes i) a torque converter 5 that is connected to the crankshaft 3; ii) a forward-reverse switching apparatus 7 that is connected via an input shaft 6 to the torque converter 5; iii) a belt type continuously variable transmission (CVT) 8 that is connected to the forward-reverse switching apparatus 7; iv) a counter drive gear 9 that is connected to the belt type CVT 8; v) a counter driven gear 11 that is in mesh with the counter drive gear 9; vi) an intermediate shaft 12 that supports the counter driven gear 11; vii) a final drive gear 13 that is supported by the intermediate shaft 12; viii) a ring gear 14 that is in mesh with the final drive gear 13, ix) a differential unit 15 that is connected to the ring gear 14; x) a transaxle housing 16 that houses the various constituent elements; xi) a transaxle case 17; and xii) a transaxle cover 18.

The torque converter 5 includes i) a drive plate 32; ii) a front cover 33 that is fixed to the crankshaft 3 of the engine 2 via the drive plate 32; iii) a pump impeller 34 that is attached to the front cover 33; iv) a turbine runner 35 that is fixed to the input shaft 6 extending along generally the same axis as the crankshaft 3, and that is able to rotate while facing the pump impeller 34; v) a stator 37 that is set to rotate only in one direction by a one-way clutch 36; vi) a damper mechanism 38; and vii) a lock-up clutch 39 that is attached to the damper mechanism 38. Also, a hollow shaft 31 is fixed to the stator 37 via the one-way clutch 36. The input shaft 6 is inserted into this hollow shaft 31.

When the engine 2 is started and the front cover 33 and the pump impeller 34 rotate, the turbine runner 35 is dragged along by the flow of oil inside the torque converter 5 and thus also starts to rotate. Also, when the difference in the rotational speeds of the pump impeller 34 and the turbine runner 35 is large, the stator 37 converts the flow of oil to a direction that helps the pump impeller 34 rotate.

If there is a large difference between the rotational speed of the pump impeller 34 and that of the turbine runner 35, the torque converter 5 functions as a torque multiplier. Conversely, if the difference between the two rotational speeds is small, the torque converter 5 functions as a fluid coupling. Once the vehicle speed reaches a predetermined speed after the vehicle 1 takes off from a standstill, the lock-up clutch 39 activates so that the power transmitted from the engine 2 to the front cover 33 is directly transmitted to the input shaft 6. Also, fluctuation in the torque transmitted from the front cover 33 to the input shaft 6 is absorbed by the damper mechanism 38.

The forward-reverse switching apparatus 7 includes a double pinion type planetary gear set 41. As shown in FIG. 2, this planetary gear set 41 includes a sun gear 42 that is attached to the end portion of the input shaft 6 that is on the belt type CVT 8 side, a ring gear 43 that is concentrically arranged on the outer peripheral side of the sun gear 42, a plurality of pinion gears 44 that are in mesh with the sun gear 42, a plurality of pinion gears 45 that are in mesh with both the ring gear 43 and the pinion gears 44, and a carrier 46 which retains the pinion gears 44 and 45 in a manner in which they are able to both rotate individually and revolve together as a unit around the sun gear 42.

The forward-reverse switching apparatus 7 also includes a forward clutch 20 that includes a frictional engagement apparatus 10, and a reverse brake 22. The carrier 46 of the forward-reverse switching apparatus 7 is fixed to the belt-type CVT 8, and the power transmission path between the carrier 46 and the input shaft 6 may be established or interrupted by the forward clutch 20. Also, the reverse brake 22 allows the ring gear 43 of the forward-reverse switching apparatus 7 to rotate or holds it stationary.

Figure 3:
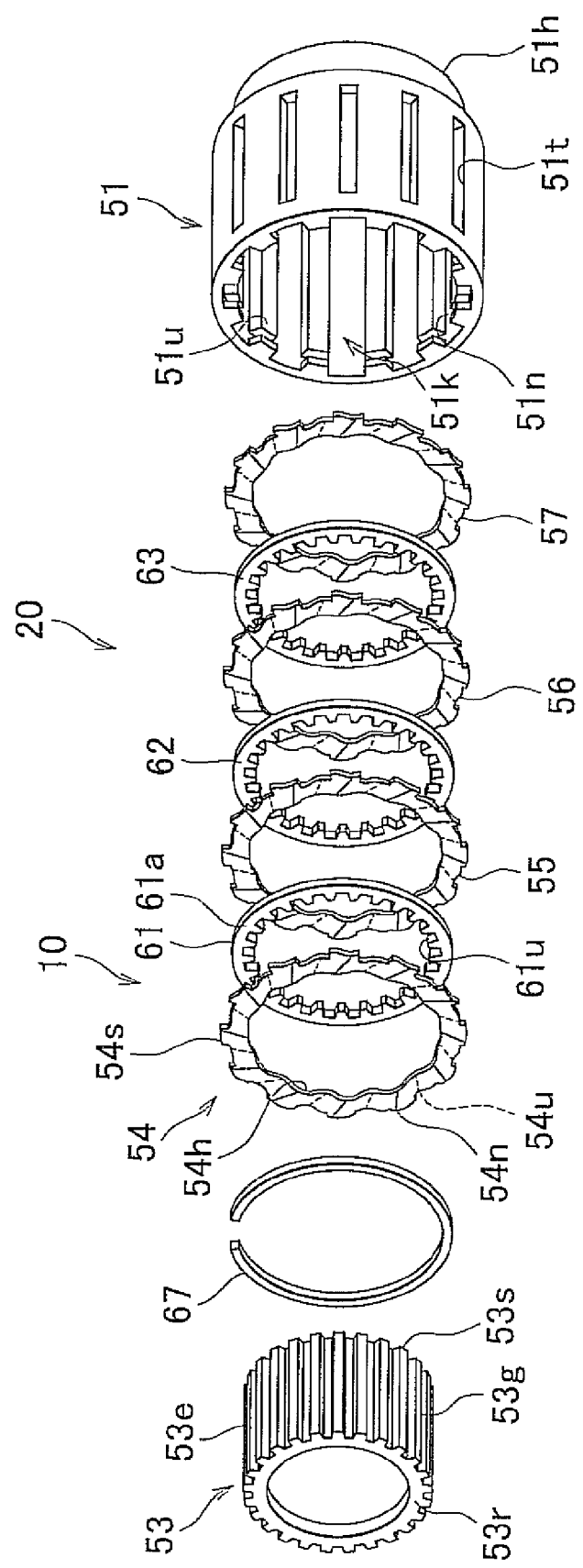
FIG. 3 shows an exploded perspective view of a forward clutch formed by the frictional engagement apparatus according to the example embodiment of the invention.

FIG. 3 shows an exploded perspective view of the forward clutch 20 formed by the frictional engagement apparatus 10 according to this example embodiment of the invention. As shown in FIGS. 2 and 3, the forward clutch 20 includes a clutch drum 51, a piston 52, a clutch hub 53, separator plates 54, 55, 56, and 57, friction plates 61, 62, and 63, a cushion plate 64, a spring 65, a support plate 66 that supports the spring 65, and a snap ring 67.

The clutch drum 51 in this example embodiment is one example of an outer cylindrical member of the frictional engagement apparatus 10, the clutch hub 53 is one example of an inner cylindrical member, the separator plates 54, 55, 56, and 57 are each examples of an outer engagement member, and the friction plates 61, 62, and 63 are each examples of an inner engagement member.

As shown in FIG. 3, the clutch drum 51 has an open end portion 51k that is formed in a cylindrical shape and is open on the planetary gear set 41 side, internal spline teeth 51u formed on the inner peripheral portion 51n, and a closed end portion 51h that is fixed to the input shaft 6. Also, a plurality of through-holes 51t that extend from the inner peripheral portion 51n all the way through to the outside of the clutch drum 51 are provided. Lubricating oil that flows through the inside of the clutch drum 51 is discharged to outside of the clutch drum 51 through these through-holes 51t.

The cylindrical piston 52 is housed within the closed end portion 51h side. An end surface 52s of the piston 52 and an inside wall surface 51s of the closed end portion 51h together define a piston chamber 52p. Hydraulic fluid is supplied into the piston chamber 52p from a hydraulic apparatus, not shown. The hydraulic pressure of the supplied hydraulic fluid forces the piston 52 away from the inside wall surface 51s of the closed end portion 51h, and against the cushion plate 64.

The clutch hub 53 includes a disc-shaped connecting portion 53r that is coupled to the planetary gear set 41, and a cylindrical portion 53e that protrudes toward the clutch drum 51 from the outer peripheral edge portion of the connecting portion 53r. The clutch hub 53 is arranged radially inward of the clutch drum 51 such that an outer peripheral portion 53g of the cylindrical portion 53e faces the inner peripheral portion 51n of the clutch drum 51. External spline teeth 53s are formed on this outer peripheral portion 53g. These external spline teeth 53s spline-engage with the internal spline teeth 61u formed on the friction plate 61.

Figure 4:
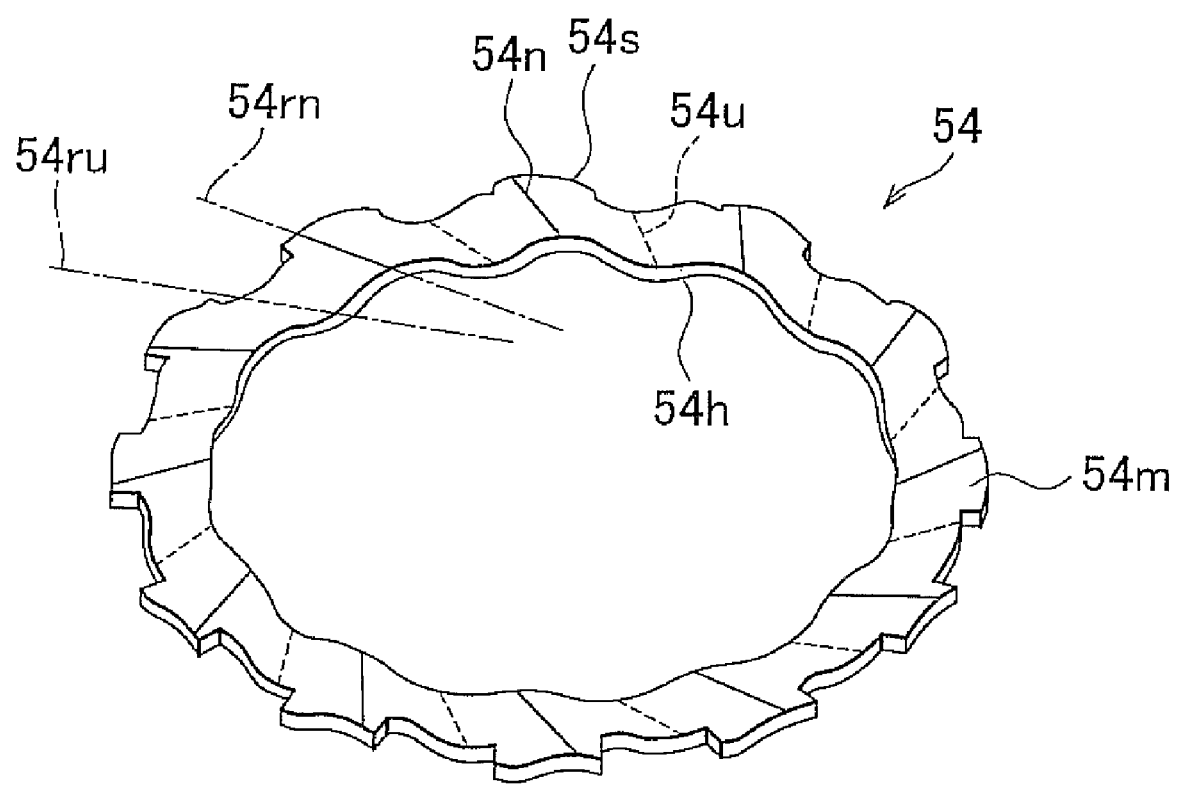
FIG. 4 shows a perspective view of a separator plate of the frictional engagement apparatus according to the example embodiment of the invention.
Figure 5A:
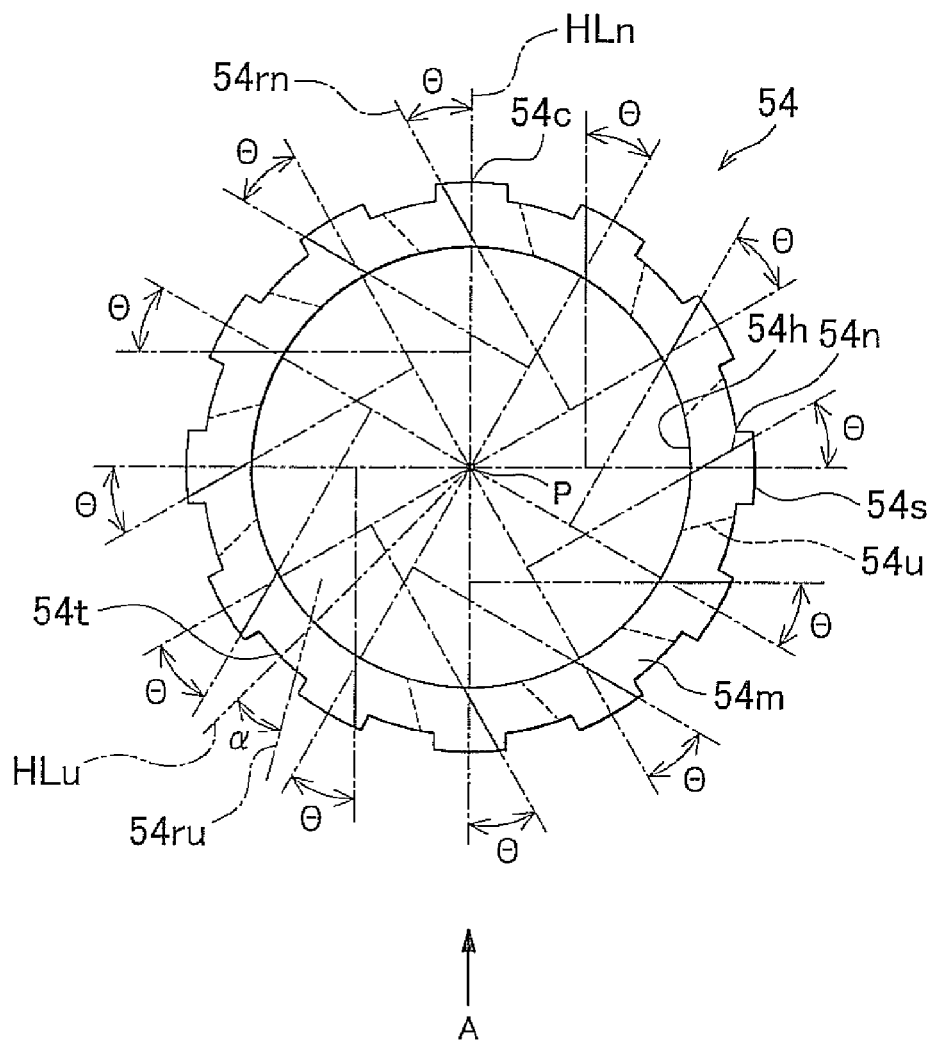
FIG. 5A shows a plan view of the separator plate of the frictional engagement apparatus according to the example embodiment of the invention.
Figure 5B:
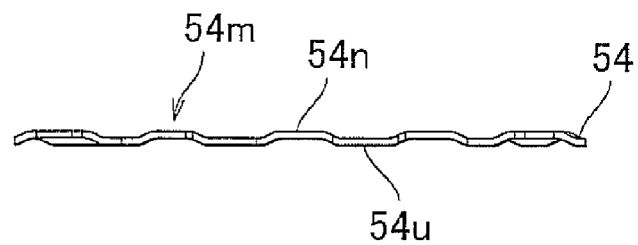
FIG. 5B shows a side view of the separator plate as viewed from the direction of arrow A in FIG. 5A.

FIG. 4 is shows a perspective view of a separator plate 54, FIG. 5A shows a plan view of the separator plate 54, and FIG. 5B shows a side view of the separator plate 54 as viewed from the direction of arrow A in FIG. 5A. As shown in FIGS. 4 and 5A, the separator plate 54 is formed in an annular shape with a through-hole 54h into which the clutch hub 53 is inserted formed in the center portion. Also, external spline teeth 54s are formed on the outer peripheral portion of the separator plate 54. These external spline teeth 54s spline-engage with the internal spline teeth 51u of the clutch drum 51, such that the separator plate 54 rotates together with the clutch drum 51 while being able to slide in the axial direction inside the clutch drum 51.

An edge 54m of the separator plate 54 has 12 concave portions 54u that dip inward in the plate thickness direction, and 12 convex portions 54n that protrude outward in the plate thickness direction. These portions 54u and 54n are arranged alternately on the edge 54m such that one convex portion 54n is in between two adjacent concave portions 54u. The concave portions 54u and the convex portions 54n are formed in a continuous series, with a ridge line 54ru of each of concave portion 54u and a ridge line 54rn of each convex portion 54n passing through a position away from a center point P of the separator plate 54.

In addition, the highest portion of each concave portion 54u is indicated by a dotted line and the highest portion of each convex portion 54n is indicated by a solid line. The ridge line 54rn of each convex portion 54n intersects, one of 12 radial lines HLn which pass through the center point P of the separator plate 54 as well as through center portions 54c of the external spline teeth 54s in the width direction of the teeth and extend radially outward. The ridge line 54rn of each convex portion 54n intersects one radial line HLn at an angle θ.

Similar to the ridge lines 54rn of the convex portions 54n, the ridge line 54ru of each concave portion 54u intersects, one of the 12 radial lines HLn, which pass through the center point P of the separator plate 54 as well as through center portions 54c of the external spline teeth 54s in the width direction of the teeth and extend radially outward. The ridge line 54ru of each concave portion 54u intersects one radial line HLn at an angle α. In addition, only one of the ridge lines 54ru of the concave portions 54u is shown in FIG. 4, but there are 12 of them, just like the ridge lines 54rn of the convex portions 54n. The number of concave portions 54u and convex portions 54n that are formed on the edge 54m may be a plurality other than 12. Also, the angles θ and α may also be set appropriately according to the structure, the size, and the shape and the like of the transaxle 4 and the forward clutch 20.

The separator plates 55, 56, and 57 are also structured just like the separator plate 54, so they too rotate together with the clutch drum 51 while being able to slide in the axial direction inside the clutch drum 51.

As shown in FIG. 3, the friction plate 61 is formed in an annular shape and has internal spline teeth 61u that spline-engage with the external spline teeth 53s of the clutch hub 53, such that the friction plate 61 rotates together with the clutch hub 53 while being able to slide in the axial direction of the clutch hub 53.

Friction material 61a that has a flat surface is affixed to the edge of this friction plate 61, such that when the friction plate 61 is frictionally engaged with the separator plate 54, the two become reliably engaged so that power is transmitted from the separator plate 54 to the friction plate 61.

The friction plates 62 and 63 are structured just like the friction plate 61, such they too rotate together with the clutch hub 53 while being able to slide in the axial direction of the clutch hub 53. Also, the friction plate 61 is arranged between the separator plate 54 and the separator plate 55, the friction plate 62 is arranged between the separator plate 55 and the separator plate 56, and the friction plate 63 is arranged between the separator plate 56 and the separator plate 57, so they frictionally engage and disengage with/from each other. These plates together form a so-called multiple disc clutch.

The cushion plate 64 is formed in an annular shape and spline-engages with the clutch drum 51, such that the cushion plate 64 rotates together with the clutch drum 51 while being able to slide in the axial direction of the clutch drum 51. Also, the cushion plate 64 is interposed between the piston 52 and the separator plate 57, such that when the piston 52 pushes against the cushion plate 64, the cushion plate 64 in turn pushes against the separator plate 57.

A plurality of springs 65 are provided evenly in the circumferential direction of the support plate 66 between the support plate 66 and the piston 52, and urge the piston 52 away from the cushion plate 64. When hydraulic pressure is not being supplied to the piston chamber 52p, the springs 65 push the piston 52 away from the cushion plate 64.

The support plate 66 is housed in the clutch drum 51, as well as fixed to the clutch drum 51, and supports the piston 52 via the springs 65.

A snap ring 67 is positioned to prevent the separator plates 54, 55, 56, and 57, and the friction plates 61, 62, and 63 from slipping out of the clutch drum 51.

As shown in FIG. 1, the belt type CVT 8 includes a primary shaft 76 which extends along generally the same axis as the input shaft 6, and a secondary shaft 77 which extends parallel to the primary shaft 76. The primary shaft 76 and the secondary shaft 77 are rotatably supported by the transaxle case 17 and the transaxle cover 18.

A primary pulley 78 is provided on the primary shaft 76, and a secondary pulley 79 is provided on the secondary shaft 77. The primary pulley 78 is formed by a fixed sheave 81 and a movable sheave 82 provided on the outer peripheral portion of the primary shaft 76. The fixed sheave 81 and the movable sheave 82 face one another such that a generally V-shaped pulley groove is formed between them.

The belt type CVT 8 also includes a cylinder portion 83 that moves the movable sheave 82. The movable sheave 82 is moved toward or away from the fixed sheave 82 by moving the movable sheave 81 in the axial direction of the primary shaft 76 using the cylinder portion 83. Similarly, the secondary pulley 79 is formed by a fixed sheave 85 and a movable sheave 86 provided on the outer peripheral portion of the secondary shaft 77. The fixed sheave 85 and the movable sheave 86 face one another such that a generally V-shaped pulley groove is formed between them.

The belt type CVT 8 further includes a cylinder portion 87 that moves the movable sheave 86. The movable sheave 86 is moved toward or away from the fixed sheave 85 by moving the movable sheave 86 in the axial direction of the secondary shaft 77 using the cylinder portion 87. A drive belt 89 is wound around the pulley groove of the primary pulley 78 and the pulley groove of the secondary pulley 79. The groove widths of the pulley grooves are changed such that the winding radius of the drive belt 89 is changed by individually controlling the hydraulic pressures of the cylinder portions 83 and 87. As a result, the speed ratio according to the belt type CVT 8 is set to the desired value and power is transmitted from the primary pulley 78 to the secondary pulley 79. Also, the counter drive gear 9 is fixed by spline-engagement to the outer peripheral portion of the secondary shaft 77 of the belt type CVT 8. Power is transmitted from the belt type CVT 8 to the differential unit 15 via this counter drive gear 9.

As shown in FIG. 1, the differential unit 15 includes a hollow differential case 15a. The differential case 15a is rotatably supported by a bearing 27 provided on the transaxle case 17, and a bearing 28 provided on the transaxle housing 16. The ring gear 14 is fixed to the outer peripheral portion of the transaxle case 15a.

A pinion shaft 15p is supported by the differential case 15a, and a pair of pinion gears 15g are rotatably supported on this pinion shaft 15p. The pair of pinion gears 15g is in mesh with a pair of side gears 15s. A left front drive shaft, not shown, is connected to one of the side gears 15s and a right front drive shaft, also not shown, is connected to the other side gear 15s. The left front drive shaft is connected to a left front wheel, not shown, and the right front drive shaft is connected to a right front wheel, also not shown.

Next, the operation of the transaxle 4 according to this example embodiment will briefly be described.

As shown in FIG. 1, when the engine 2 is driven, the drive plate 32, the front cover 33, and the pump impeller 34 of the torque converter 5 rotate via the crankshaft 3. At this time, the oil circulation flow rate generated in the torque converter 5 drags the turbine runner 35 along so that it rotates. As the turbine runner 35 rotates, so does the input shaft 6, which is fixed to the turbine runner 35.

As shown in FIG. 2, as the input shaft 6 rotates, the sun gear 42 of the planetary gear set 41 of the forward-reverse switching apparatus 7 rotates, such that the pinion gears 44 and 45 each rotate, thereby causing the carrier 46 to rotate. The direction of rotation switches between forward and reverse, as appropriate, depending on the operating state and the operation by the driver. Specifically, the ECU appropriately controls the direction of rotation through appropriate control of the application or release of the forward clutch 20 and of the reverse brake 22.

Then when the rotation of the carrier 46 is transmitted to the primary pulley 78 via the primary shaft 76 such that the primary pulley 78 rotates, it causes the secondary pulley 79 to rotate via the drive belt 89 such that the secondary shaft 77 rotates. Accordingly, the counter drive gear 9 rotates such that the counter driven gear II and the final drive gear 13 rotate, thereby causing the ring gear 14 to rotate. Then the differential unit 15 operates such that the left and right front drive shafts that are connected to the differential unit 15 rotate, and the rotation is ultimately transmitted to the left and right front wheels.

Figure 6A:
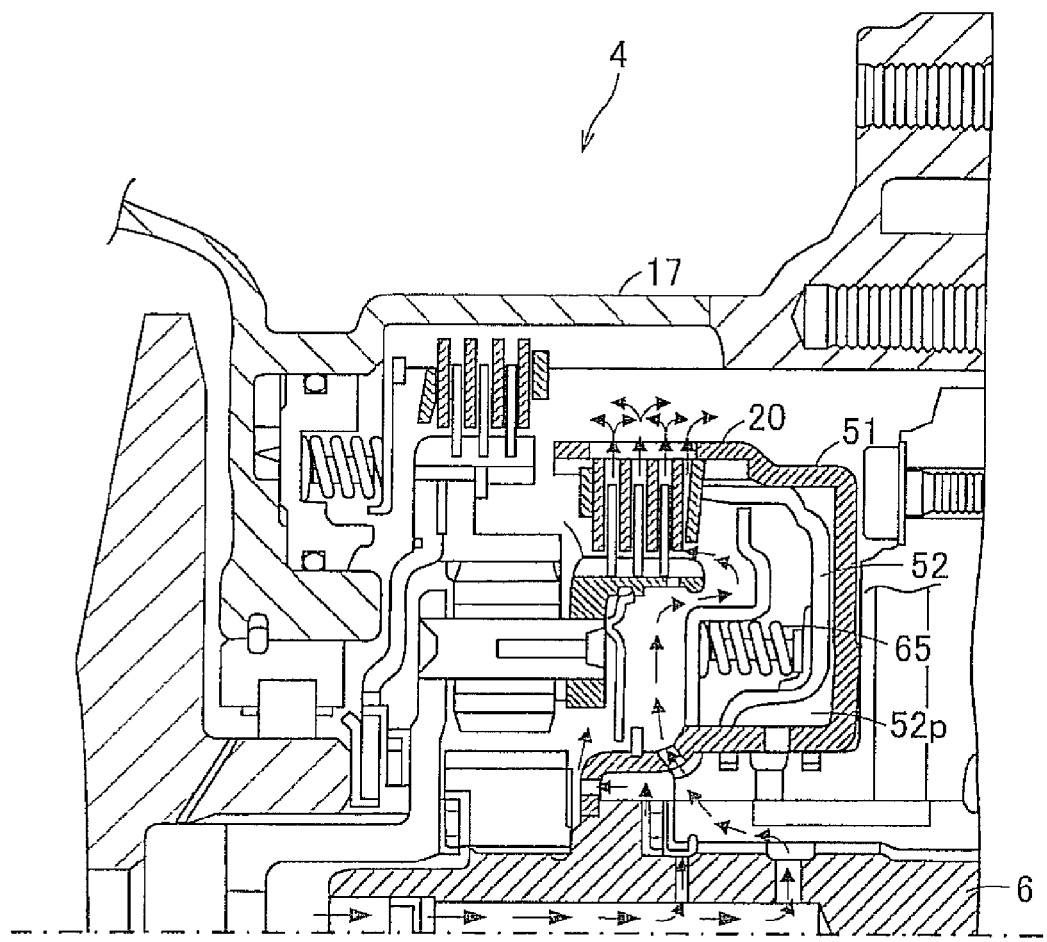
FIG. 6A shows a partial enlarged sectional view of the transaxle shown in FIG. 2.
Figure 6B:
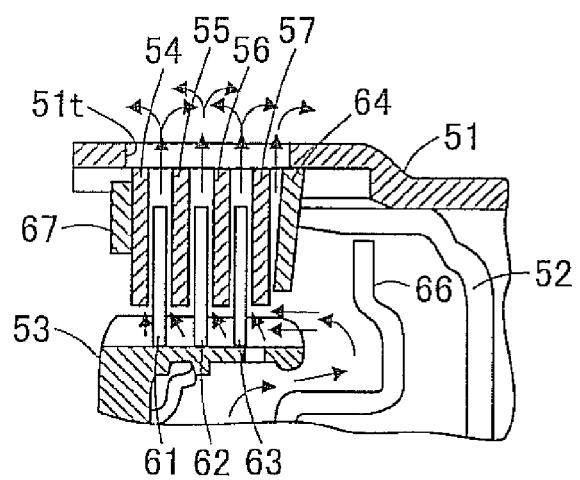
FIG. 6B shows a partial enlarged sectional view of the transaxle shown in FIG. 6A.
Figure 7A:
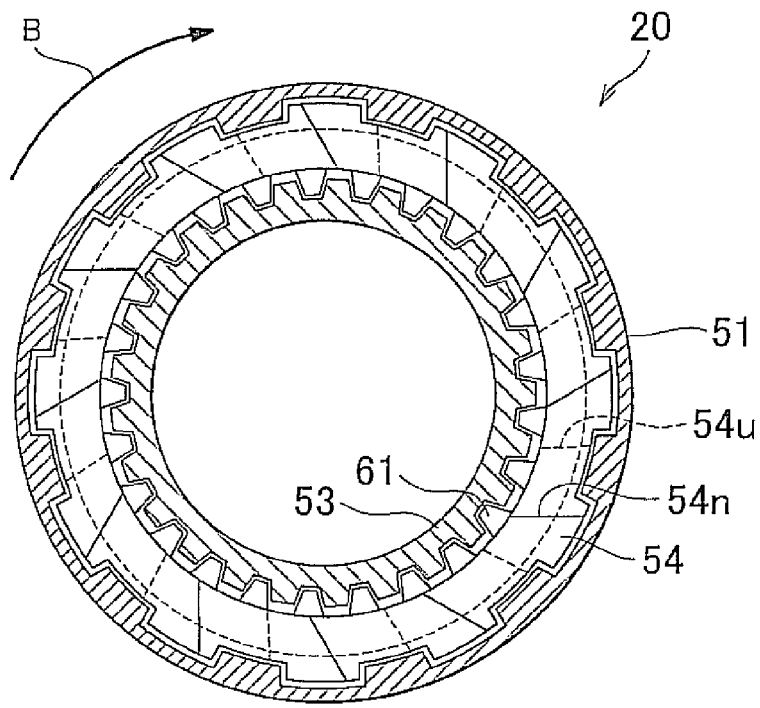
FIG. 7A shows a sectional view of the forward clutch in the frictional engagement apparatus according to the example embodiment of the invention.
Figure 7B:
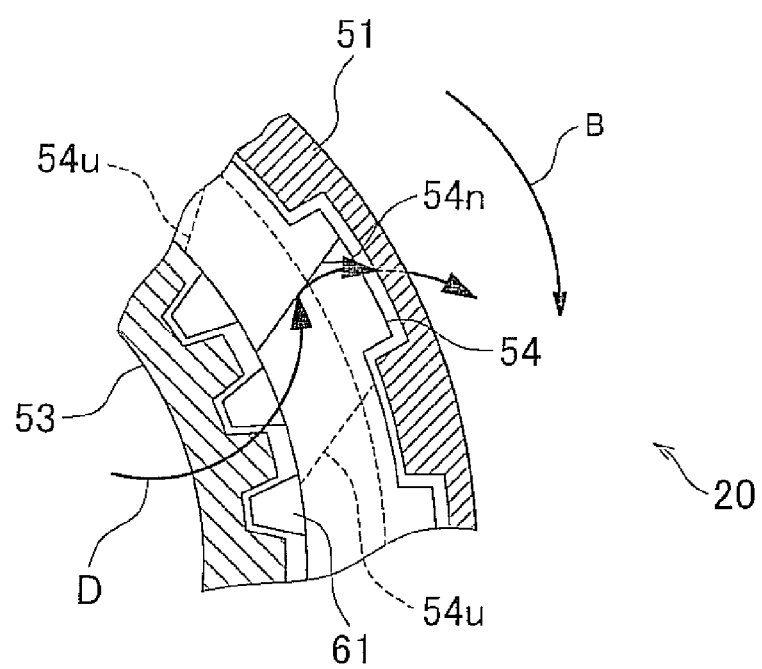
FIG. 7B shows a partial enlarged sectional view of the forward clutch shown in FIG. 7A, showing the flow of lubricating oil between the friction plate and the separator plate of the forward clutch.
Figure 8:
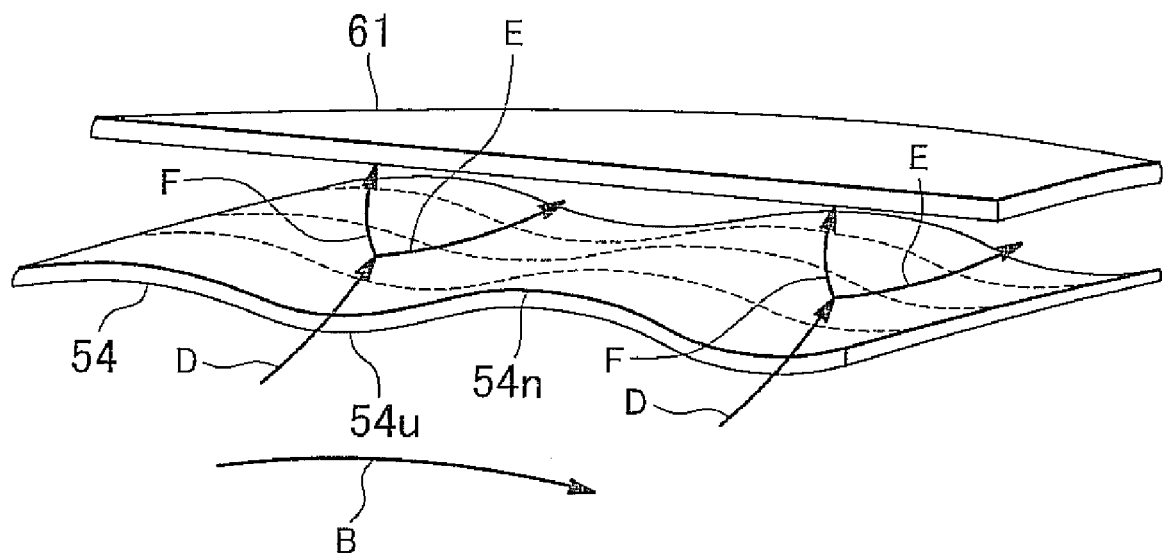
FIG. 8 shows a partial perspective view of the flow of lubricating oil between the friction plate and the separator plate of the forward clutch in the frictional engagement apparatus according to the example embodiment of the invention.

Next, the application and release of the forward clutch 20 will be described with reference to FIGS. 6A to 8. Incidentally, FIG. 6A shows a partial enlarged sectional view of the transaxle shown in FIG. 2, FIG. 6B shows a partial enlarged sectional view of the transaxle shown in FIG. 6A, FIG. 7A shows a sectional view of the forward clutch, and FIG. 7B shows a partial enlarged sectional view of the forward clutch shown in FIG. 7A, showing the flow of lubricating oil between the friction plate and the separator plate of the forward clutch. Also, FIG. 8 shows a partial perspective view of the flow of lubricating oil between the friction plate and the separator plate of the forward clutch.

In the forward clutch 20, when the input shaft 6 shown in FIG. 1 rotates, first the clutch drum 51 rotates together with the input shaft 6. Accordingly, the separator plates 54, 55, 56, and 57 and the snap ring 67 rotate together with the clutch drum 51. When the forward clutch 20 is applied, hydraulic fluid is supplied to the piston chamber 52p, as shown in FIGS. 6A and 6B. The resultant pressure inside the piston chamber 52p causes the piston 52 to move toward the cushion plate 64 against the urging force of the springs 65.

When the piston 52 is moved toward the cushion plate 64, the tip end portion of the piston 52 pushes against the cushion plate 64, causing the cushion plate 64 to frictionally engage with the separator plate 57. Then the separator plate 57 frictionally engages with the friction plate 63, which then frictionally engages with the separator plate 56, which in turn frictionally engages with the friction plate 62, which then frictionally engages with the separator plate 55, which in turn frictionally engages with the friction plate 61, which then frictionally engages with the separator plate 54, which in turn frictionally engages with the snap ring 67.

In contrast, when the forward clutch 20 is released, hydraulic fluid inside the piston chamber 52p is discharged from the piston chamber 52p, thereby reducing the pressure in the piston chamber 52p, such that the urging force of the springs 65 causes the piston 52 to move away from the cushion plate 64. At this time, the cushion plate 64 frictionally disengages from the separator plate 54.

Accordingly, the separator plate 57 frictionally disengages from the friction plate 63, which then frictionally disengages from the separator plate 56, which in turn frictionally disengages from the friction plate 62, which then frictionally disengages from the separator plate 55, which in turn frictionally disengages from the friction plate 61, which then frictionally disengages from the separator plate 54, which in turn frictionally disengages from the snap ring 67. As a result of this frictional disengagement, the forward clutch is released such that the transmission of power from the clutch drum 61 to the clutch hub 53 is interrupted.

When the forward clutch 20 is released, i.e., when the separators 54, 55, 56, and 57 are disengaged from the friction plates 61, 62, and 63, hydraulic fluid flows in the gaps between the separator plates 54, 55, 56, and 57 and the friction plates 61, 62, and 63, as shown by the arrows in FIGS. 6A and 6B. The hydraulic fluid flows into a hydraulic fluid supply passage inside the input shaft 6, and is discharged into a space in the transaxle 4 through oil holes formed in the input shaft 6 by the action of centrifugal force, after which the lubricating oil then flows inside the transaxle 4.

As shown by the arrows, the lubricating oil discharged through the oil holes in the input shaft 6 flows from the clutch hub 53 into the gaps between the separator plates 54, 55, 56, and 57 and the friction plates 61, 62, and 63, and is discharged outside of the clutch drum 51 through the through-holes 51t in the clutch drum 51 by the action of centrifugal force.

When the separator plates 54, 55, 56, and 57 are disengaged from the friction plates 61, 62, and 63, the power from the engine 2 is transmitted to the separator plates 54, 55, 56, and 57 because they are connected to the engine 2 via the input shaft 6, and as a result, the separator plates 54, 55, 56, and 57 rotate. In contrast, the friction plates 61, 62, and 63 are not engaged with the separator plates 54, 55, 56, and 57 so they remain still.

Therefore, there is relative rotation between the friction plates 61, 62, and 63 and the separator plates 55, 56, and 57. At this time, shearing force is produced in the lubricating oil present in the gaps between the separator plates 55, 56, and 57 and the friction plates 61, 62, and 63. The action of this shearing force causes the rotating separator plates 54, 55, 56, and 57 to be dragged on by the non-rotating friction plates 61, 62, and 63, such that rotational resistance is generated in the rotating separator plates 54, 55, 56, and 57. This rotational resistance acts on the engine 2 via the input shaft 6, becoming rotational resistance on the engine 2, which leads to loss in the engine 2. As a result, the amount of fuel consumed by the engine 2 increases, which may lead to a decrease in fuel efficiency.

The separator plate 54 in this example embodiment has the concave portions 54u and the convex portions 54n, with the concave portions 54u and the convex portions 54n formed continuous and repeating, with the ridge lines 54ru of the concave portions 54u and the ridge lines 54rn of the convex portions 54n passing through a position away from the center point P of the separator plate 54. Accordingly, when the separator plate 54 rotates in direction B, as shown in FIGS. 7A and 7B, the lubricating oil flows in the direction of the arrows shown in FIG. 7B. That is, the lubricating oil that has flowed in between the separator plate 54 and the friction plate 61 collides with the sloped edge of the convex portion 54n and is discharged through the through-holes 51t in the clutch drum 51.

When the lubricating oil collides with the sloped edge of the convex portion 54n, the lubricating oil in the gap between the separator plate 54 and the friction plate 61 flows in the direction of arrow F which is orthogonal to the direction of arrow D in which the lubricating oil flows, as shown in FIG. 8. The flow force of the lubricating oil in the direction of arrow F acts in a direction that peels the friction plate 61 away from the separator plate 54, such that the separator plate 54 and the friction plate 61 both move in directions that widen the gap between them. As a result, the drag torque generated between the separator plate 54 and the friction plate 61 is reduced. In particular, when the relative rotational speed between the separator plate 54 and the friction plate 61 is low, the action of the flow force of the lubricating oil in direction F is relatively large, so the drag torque is significantly reduced.

Also, with the separator plate 54 in this example embodiment, the gap through which the lubricating oil flows is defined by the concave portions 54u and the convex portions 54n. The concave portions 54u and the convex portions 54n are formed so that the ridge lines 54ru of the concave portions 54u and the ridge lines 54rn of the convex portions 54n pass through positions away from the center point P of the separator plate 54, so the gap is relatively large compared with the gaps in the conventional separator plates. Therefore, the lubricating oil easily flows through this gap in the direction of arrows D and E and out of the clutch drum 51. As a result, the drag torque generated between the separator 54 and the friction plate 61 is reduced.

In contrast, if the relative rotational speed between the separator plate 54 and the friction plate 61 is high, lubricating oil that has flowed into the gap between the separator plate 54 and the friction plate 61 in the direction of arrow D tends to flow in the direction of arrow E, without colliding with the sloped edge of the convex portion 54n as it does when the relative rotational speed is low. Thus, the lubricating oil flows smoothly from the direction of arrow D to the direction of arrow E and then out through the through-holes 51t in the clutch drum 51. The flow of lubricating oil in the gaps between the separator plates 55, 56, and 57 and the friction plates 62 and 63 is the same as it is in the gap between the separator plate 54 and the friction plate 61 described here.

The frictional engagement apparatus 10 according to this example embodiment, which is structured as described above, yields the following effects.

That is, the frictional engagement apparatus 10 includes the cylindrical clutch drum 51, which has the open end portion 51k and the internal spline teeth 51u formed on the inner peripheral portion 51n, and the separator plate 54 which moves in the axial direction of the clutch drum 51 and spline-engages with the internal spline teeth 51u formed on the inner peripheral surface 51n of the drum clutch 51 such that the separator plate 54 rotates together with the clutch drum 51, and the like. The edge 54m of the separator plate 54 has concave portions 54u and the convex portions 54n. The concave portions 54u and the convex portions 54n are formed in a continuous series, with the ridge lines 54ru of the concave portions 54u and the ridge lines 54rn of the convex portions 54n passing through a position away from the center point P of the separator plate 54. The ridge lines 54rn of the convex portions 54n intersect the plurality of radial lines HLn, which extend radially outward through the center point P at an angle θ.

As a result, when the separator plate 54 rotates in the direction of arrow B, as shown in FIGS. 7A and 7B, the lubricating oil flows in the direction of the arrows in FIG. 7B. When the lubricating oil that flows in between the separator plate 54 and the friction plate 61 collides with the sloped edge of the convex portion 54n, the oil pools in the gap between the separator plate 54 and the friction plate 61, as shown in FIG. 8, and lubricating oil flows in the direction of arrow F which is orthogonal to the direction the direction of arrow D in which the lubricating oil flows. The flow force of the lubricating oil in the direction of arrow F acts in a direction that peels the friction plate 61 away from the separator plate 54. The peeling action effectively reduces the drag torque generated between the separator plate 54 and the friction plate 61. In particular, if the relative rotational speed between the separator plate 54 and the friction plate 61 is low, lubricating oil tends to collide with the sloped edges of the convex portions 54n so the peeling effect of the flow force of the lubricating oil in the direction of arrow F is relatively large.

Also, the gap through which the lubricating oil flows is defined by the concave portions 54u and the convex portions 54n. The concave portions 54u and the convex portions 54n are formed such that the ridge lines 54ru of the concave portions 54u and the ridge lines 54rn of the convex portions 54n pass through positions away from the center point P of the separator plate 54. Therefore, the gap is relatively large compared with the gap in the related art so the lubricating oil easily flows through this gap in direction of arrows D and E and out of the clutch drum 51. As a result, drag torque generated between the separator 54 and the friction plate 61 is effectively reduced.

On the other hand, if the relative rotational speed between the separator plate 54 and the friction plate 61 is high, lubricating oil that has flowed into the gap between the separator plate 54 and the friction plate 61 in the direction of arrow D tends to flow in the direction of arrow E, without colliding with the sloped edge of the convex portion 54n as it does when the relative rotational speed is low. Thus, the lubricating oil flows smoothly from the direction of arrow D to the direction of arrow E so the drag torque is reduced and lubricating oil is better able to flow out from the gap between the separator plate 54 and the friction plate 61. As a result, the separator plate 54 and the friction plate 61 are well cooled by the lubricating oil, which improves the durability of the friction plate 61.

In this way, with the frictional engagement apparatus according to this example embodiment, drag torque generated by lubricating oil in the gap between the friction plate 61 and the separator plate 54 may be reduced over a wide range from a low relative rotation speed of the friction plate 61 and the separator plate 54 to a high relative rotation speed of the friction plate 61 and the separator plate 54 when the friction plates 61, 62, and 63 are disengaged from the separator plates 54, 55, 56, and 57.

In addition, in the frictional engagement apparatus 10 according to this example embodiment, the edge 54m of the separator plate 54 has the 12 concave portions 54u that dip inward in the plate thickness direction, and the 12 concave portions 54u that protrude outward in the plate thickness direction, with each concave portion 54u being arranged between two adjacent convex portions 54n. Also, the concave portions 54u and the convex portions 54n are formed repeated and continuous, with the ridge lines 54ru of the concave portions 54u and the ridge lines 54rn of the convex portions 54n passing through positions away from the center point P of the separator plate 54. Moreover, the ridge lines 54rn of the convex portions 54n intersect at an angle θ with the 12 radial lines HLn which pass through the center point P of the separator plate 54 as well as through the center of the external spline teeth 54s in the width direction of the teeth, and extend radially outward.

However, in the frictional engagement apparatus of the invention, some of the concave portions and convex portions may be formed such that their ridge lines pass through the center point of the outer engagement member. In this example embodiment, the angles θ of the ridge lines of the plurality of convex portions are all equal, and the angles α of the ridge lines of the plurality of concave portions are all equal. However, neither the angles θ nor the angles α have to be equal. That is, the angle θ of each of the plurality of convex portions may be different from the other angles θ, and the angle α of each of the plurality of concave portions may be different from the other angles α. Also, when the angles θ of the ridge lines of the concave portions are all equal, and the angles α of the ridge lines of the concave portions are all equal, the angles θ may be equal to the angles α or different from the angles α. Further, instead of forming the concave portions and convex portions on the edge of the separator plates, such concave portions and convex portions may be formed on the edge of the friction plates, and the edge of the separator plates that frictionally engage with the friction plates may instead be formed flat.

Also, the ridge lines 54rn of the convex portions 54n may have a structure other than the structure in which they intersect at an angle θ with the radial lines HLn which pass through the center point P of the separator plate 54 as well as through the center portion 54c of the external spline teeth in the width direction of the teeth, and extend radially outward. Hereinafter, modified examples of the frictional engagement apparatus 10 in which the concave portions and the convex portions have other shapes that differ from the shapes described in the foregoing example embodiment will be described.

Figure 9A:
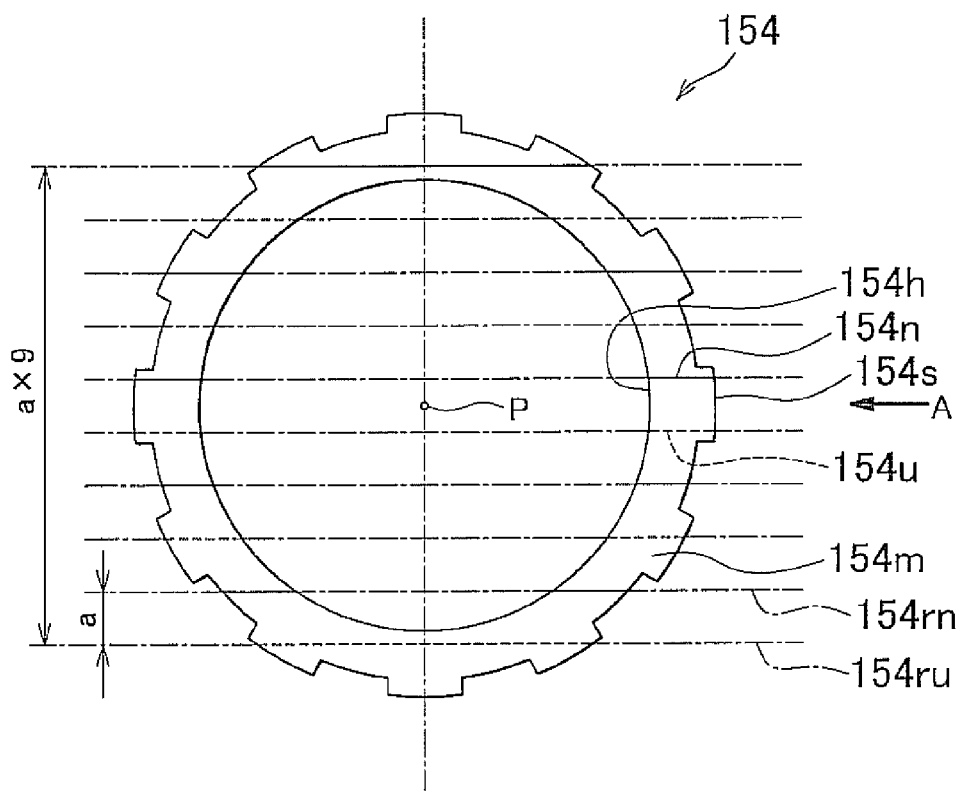
FIG. 9A shows a plan view of a separator plate that constitutes part of a frictional engagement apparatus according to a first modification of the example embodiment of the invention.
Figure 9B:
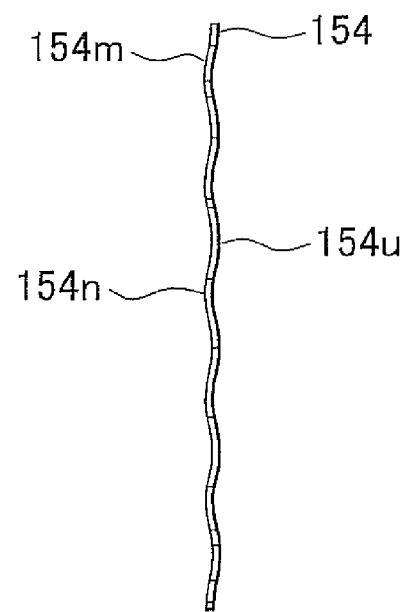
FIG. 9B shows a side view of the separator plate as viewed from the direction of arrow A in FIG. 5A.
Figure 10A:
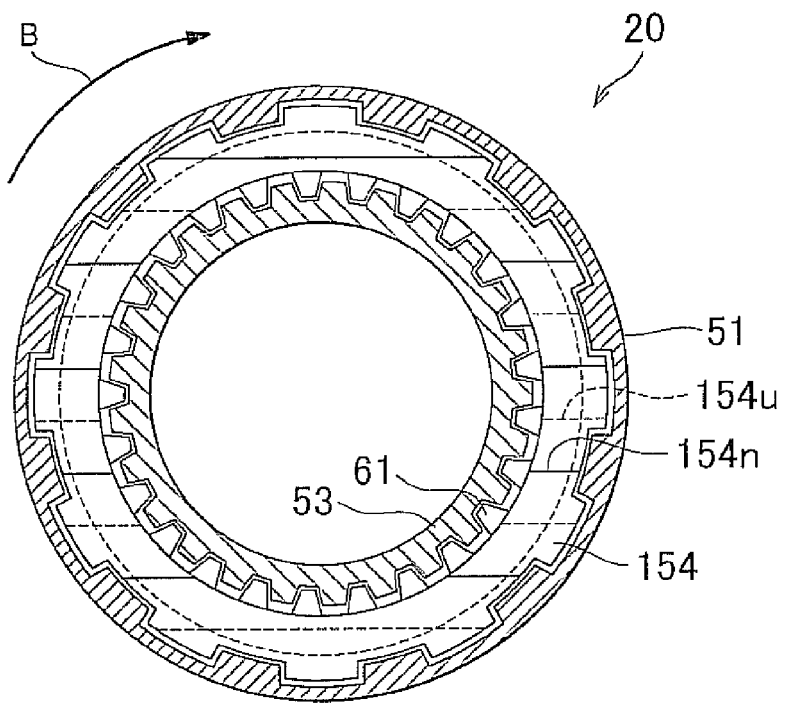
FIG. 10A shows a sectional view of a forward clutch in the frictional engagement apparatus according to the modification of the example embodiment of the invention.
Figure 10B:
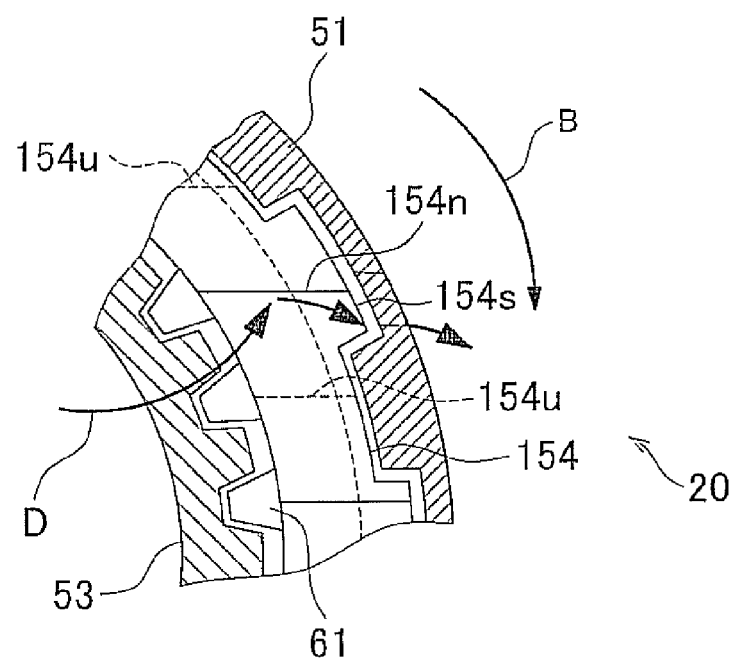
FIG. 10B shows a partial enlarged sectional view of the forward clutch shown in FIG. 10A, showing the flow of lubricating oil between a friction plate and the separator plate of the forward clutch.

FIG. 9A shows a plan view of a separator plate that constitutes part of a frictional engagement apparatus according to a first modified example of the example embodiment of the invention, and FIG. 9B shows a side view of the separator plate as viewed from the direction of arrow A in FIG. 5A. FIG. 10A shows a sectional view of a forward clutch, and FIG. 10B shows a partial enlarged sectional view of the forward clutch shown in FIG. 10A, showing the flow of lubricating oil between a friction plate and the separator plate of the forward clutch.

As shown in FIGS. 9A and 9B, a separator plate 154 in the forward clutch 20 that forms the frictional engagement apparatus 10 is formed in an annular shape and has a through-hole 154*h* into which the clutch hub 53 is inserted formed in the center portion, just as in the example embodiment described above. Also, external spline teeth 154*s* are formed on the outer peripheral portion of the separator plate 154. These external spline teeth 154*s* spline-engage with the spline internal teeth 51*u* of the clutch drum 51, such that the separator plate 154 rotates together with the clutch drum 51 while being able to slide in the axial direction inside the clutch drum 51.

An edge 154*m* of this separator plate 154 has nine concave portions 154*u* that dip inward in the plate thickness direction, and nine convex portions 154*n* that protrude outward in the plate thickness direction. These portions 154*u* and 154*n* are alternately arranged on the edge 154*m* such that one convex portion 154*n* is in between two adjacent concave portions 154*u*. The concave portions 154*u* and the convex portions 154*n* are formed generally parallel at pitch intervals a, such that a ridge line 154*ru* of each of concave portion 154*u* and a ridge line 154*rn* of each convex portion 154*n* passes through a position away from a center point P of the separator plate 154.

Incidentally, the number of concave portions 154*u* and convex portions 154*n* formed on the edge 154*m* may be a plurality other than nine. Also, the size of the pitch intervals a may also be set appropriately according to the structure, the size, and the shape and the like of the transaxle 4 and the forward clutch 20. Also, the length of the concave portions 154*u* may differ from that the convex portions 154*n*.

A plurality of separator plates other than the separator plate 154 are structured like the separator plate 154, so they too rotate together with the clutch drum 51 while being able to slide in the axial direction inside the clutch drum 51.

This structure is able to yield the following effects. When the separator plate 154 rotates in the direction of arrow B, as shown in FIGS. 10A and 10B, the lubricating oil flows in the direction of the arrows in FIG. 10B. Just as with the example embodiment described above, when the lubricating oil that flows in between the separator plate 154 and the friction plate 61 collides with the sloped edge of the convex portions 154*n*, the oil pools in the gap between the separator plate 154 and the friction plate 61, and lubricating oil flows in the thickness direction of the separator plate 154, which is orthogonal to the direction the direction in which the lubricating oil flows. Accordingly, the flow force of the lubricating oil in the plate thickness direction acts in the direction that peels the friction plate 61 away from the separator plate 154. The peeling action effectively reduces the drag torque generated between the separator plate 154 and the friction plate 61. In particular, when the relative rotational speed between the separator plate 154 and the friction plate 61 is low, lubricating oil tends to collide with the sloped edges of the convex portions 154*n* so the peeling effect of the flow force of the lubricating oil in the plate thickness direction is relatively large.

Also, the gap through which the lubricating oil flows is defined by the concave portions 154*u* and the convex portions 154*n*. The concave portions 154*u* and the convex portions 154*n* are formed such that the ridge lines 154*ru* of the concave portions 154*u* and the ridge lines 154*rn* of the convex portions 154*n* pass through positions away from the center point P of the separator plate 154. Therefore, the gap is relatively large compared with the gap in the related art so the lubricating oil easily flows through this gap in direction of the arrows in FIG. 10B and out of the clutch drum 51. As a result, drag torque generated between the separator plate 154 and the friction plate 61 is effectively reduced.

On the other hand, if the relative rotational speed between the separator plate 154 and the friction plate 61 is high, lubricating oil that has flowed into the gap between the separator plate 154 and the friction plate 61 tends to flow through the gap without colliding with the sloped edge of the convex portion 154*n* as it does when the relative rotational is low, as described above. Thus, the lubricating oil flows smoothly in the gap so the drag torque is reduced and lubricating oil is better able to flow out from the gap between the separator plate 154 and the friction plate 61. As a result, the separator plate 154 and the friction plate 61 are able to be well cooled by the lubricating oil, which improves the durability of the friction plate 61.

In this way, with the frictional engagement apparatus according to this first modified embodiment of the example embodiment, drag torque generated by lubricating oil in the gap between the friction plate 61 and the separator plate 154 is reduced over a wide range from a low relative rotation speed of the friction plate 61 and the separator plate 154 to a high relative rotation speed of the friction plate 61 and the separator plate 154 when the friction plates 61, 62, and 63 are disengaged from another plurality of separator plates.

In addition, in the first modified example of the example embodiment, the ridge lines 154*ru* of the plurality of concave portions 154*u* that dip inward in the plate thickness direction and the ridge lines 154*rn* of the plurality of convex portions 154*n* that protrude outward in the plate thickness direction are formed extending generally parallel at predetermined intervals on the edge 154*m* of the separator plate 154. Alternatively, however, in the frictional engagement apparatus of the invention, the ridge lines of the plurality of concave portions that dip inward in the plate thickness direction and the ridge lines of the plurality of convex portions that protrude outward in the plate thickness direction may extend generally parallel at predetermined intervals on the edge of the friction plate.

Figure 11A:
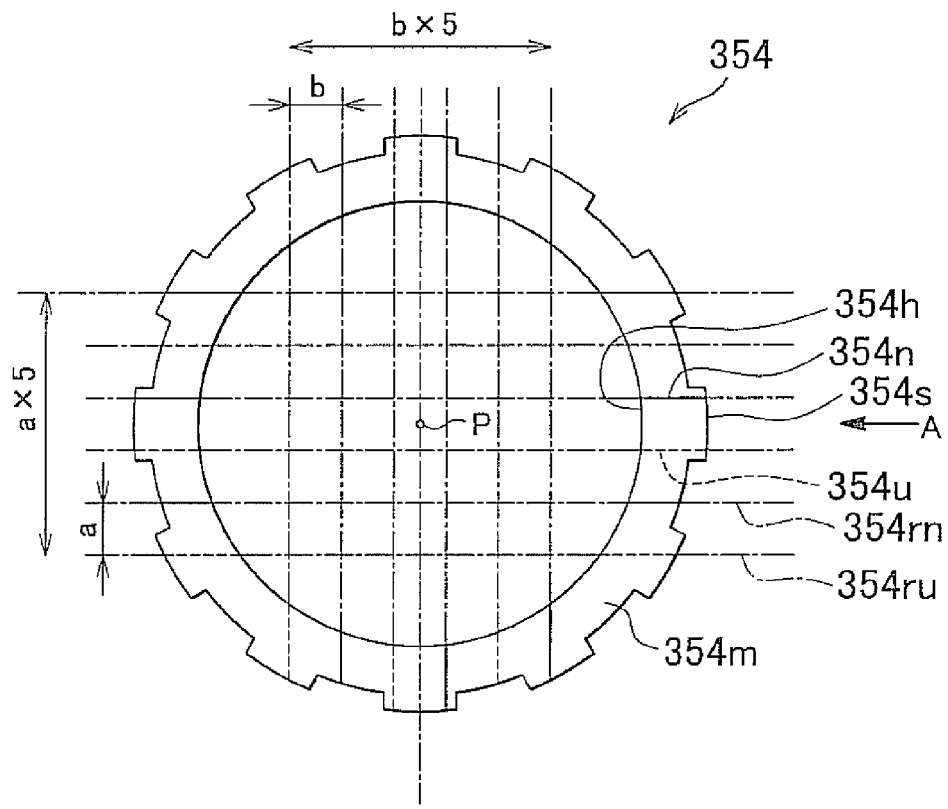
FIG. 11A shows a plan view of a separator plate which constitutes part of a frictional engagement apparatus according to a second modified example of the example embodiment of the invention.
Figure 11B:
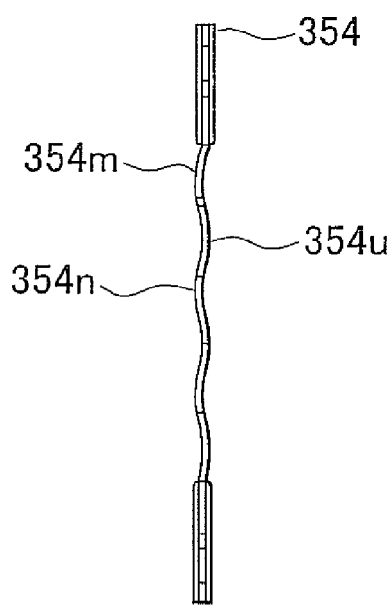
FIG. 11B shows a side view of the separator plate as viewed from the direction of arrow A in FIG. 11A.
Figure 12A:
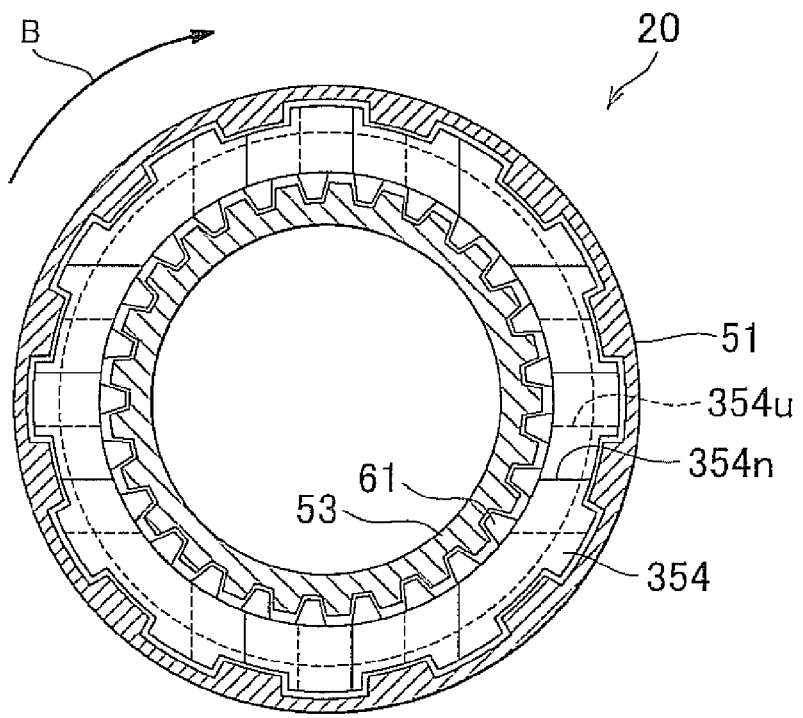
FIG. 12A shows a sectional view of a forward clutch which constitutes part of the frictional engagement apparatus according to the second modified example of the example embodiment of the invention.
Figure 12B:
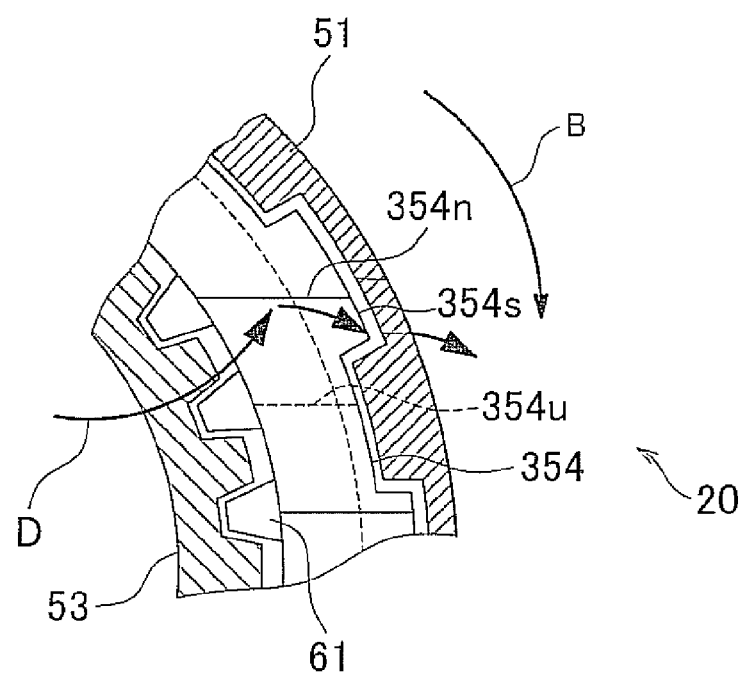
FIG. 12B shows a partial enlarged sectional view of the forward clutch shown in FIG. 12A, showing the flow of lubricating oil between the friction plate and the separator plate of the forward clutch.

FIG. 11A shows a plan view of a separator plate which constitutes part of a frictional engagement apparatus according to a second modified example of the example embodiment of the invention, and FIG. 11B shows a side view of the separator plate as viewed from the direction of arrow A in FIG. 11A. Also, FIG. 12A shows a sectional view of a forward clutch, and FIG. 12B shows a partial enlarged sectional view of the forward clutch shown in FIG. 12A, showing the flow of lubricating oil between the friction plate and the separator plate of the forward clutch.

As shown in FIGS. 11A and 11B, a separator plate 354 in the forward clutch 20, which forms the frictional engagement apparatus 10 according to the second modified example, is formed in an annular shape and has a through-hole 354*h*, into which the clutch hub 53 is inserted, formed in the center portion, just as in the example embodiment described above. Also, the external spline teeth 354*s* are formed on the outer peripheral portion of the separator plate 354. The external spline teeth 354*s* spline-engage with the internal spline teeth 51*u* of the clutch drum 51, such that the separator plate 354 rotates together with the clutch drum 51 while being able to slide in the axial direction inside the clutch drum 51.

An edge 354*m* of the separator plate 354 has six concave portions 354*u* which dip inward in the plate thickness direction and are arranged generally parallel in the direction of arrow A, and six convex portions 354*n* which protrude outward in the plate thickness direction and are arranged generally parallel in the direction of arrow A. The portions 354*u* and 354*n* are alternately arranged on the edge 354*m* such that one convex portion 354*n* is in between two adjacent concave portions 354*u*. The ridge lines of the concave portions 354*u* and the convex portions 354*n* form a first group of ridge lines.

The edge 354*m* also has six concave portions 354*u* which dip inward in the plate thickness direction and are arranged generally parallel in a direction orthogonal to the direction of arrow A, and six convex portions 354*n* which protrude outward in the plate thickness direction and are arranged generally parallel in a direction orthogonal to the direction of arrow A. The portions 354*u* and 354*n* are alternately arranged on the edge 354*m* such that one convex portion 354*n* is in between two adjacent concave portions 354*u*. The ridge lines of the concave portions 354*u* and the convex portions 354*n* form a second group of ridge lines. The concave portions 354*u* and the convex portions 354*n* are formed generally parallel at pitch intervals a that are generally parallel to the direction of arrow A, and generally parallel at pitch intervals b in a direction orthogonal to the direction of arrow A, such that the ridge lines 354*ru* of the concave portions 354*u* and the ridge lines 354*rn* of the convex portions 354*n* pass through positions away from the center point P of the separator plate 354.

In addition, the highest portions of the concave portions 354*u* are indicated by the dotted lines, and the highest portions of the convex portions 354*n* are indicated by the solid lines. The number of concave portions 354*u* and convex portions 354*n* formed on the edge 354*m* may be a plurality other than 12. Furthermore, the size of the pitch intervals a and b may also be set as appropriate in accordance with the structure, the size, and the shape and the like of the transaxle 4 and the forward clutch 20. Also, the length of the concave portions 354*u* and the convex portions 354*n* may be the same or different.

A plurality of separator plates other than the separator plate 354 are structured like the separator plate 354, so they also rotate together with the clutch drum 51 while being able to slide in the axial direction inside the clutch drum 51.

This structure is able to yield the following effects. When the separator plate 354 rotates in the direction of arrow B, as shown in FIGS. 12A and 12B, the lubricating oil flows in the direction of the arrows in FIG. 12B. Just as with the example embodiment described above, when the lubricating oil that flows in between the separator plate 354 and the friction plate 61 collides with the sloped edge of the convex portions 354*n*, the oil pools in the gap between the separator plate 354 and the friction plate 61, and lubricating oil flows in the thickness direction of the separator plate 354, which is orthogonal to the direction the direction in which the lubricating oil flows. Accordingly, the flow force of the lubricating oil in the plate thickness direction acts in the direction that peels the friction plate 61 away from the separator plate 354. The peeling action effectively reduces the drag torque generated between the separator plate 354 and the friction plate 61.

In particular, when the relative rotational speed between the separator plate 354 and the friction plate 61 is low, lubricating oil tends to collide with the sloped edges of the convex portions 354*n* so the peeling effect of the flow force of the lubricating oil in the plate thickness direction is relatively large. Also, the gap through which the lubricating oil flows is defined by the concave portions 354*u* and the convex portions 354*n*. The concave portions 354*u* and the convex portions 354*n* are formed such that the ridge lines 354*ru* of the concave portions 354*u* and the ridge lines 354*rn* of the convex portions 354*n* pass through positions away from the center point P of the separator plate 354. Therefore, the gap is relatively large compared with the gap in the related art so the lubricating oil easily flows through this gap in direction of the arrows and out of the clutch drum 51. As a result, drag torque generated between the separator 354 and the friction plate 61 is effectively reduced.

In contrast, if the relative rotational speed between the separator plate 354 and the friction plate 61 is high, lubricating oil that has flowed into the gap between the separator plate 354 and the friction plate 61 tends to flow through the gap without colliding with the sloped edge of the convex portion 354*n* as it does in the case of low speed relative rotation as described above. Thus, the lubricating oil flows smoothly in the gap so the drag torque is reduced and lubricating oil is better able to flow out from the gap between the separator plate 354 and the friction plate 61. As a result, the separator plate 354 and the friction plate 61 are able to be well cooled by the lubricating oil, which improves the durability of the friction plate 61.

In the separator plate 354 in this second modified example, the ridge lines of the first group of ridge lines are orthogonal to the ridge lines of the second group of ridge lines and the upper, lower, left, and right concave portions 354*u* and convex portions 354*n* are formed in a generally symmetrical shape. For example, drag torque is be effectively reduced to the same degree regardless of whether the relative rotation between the separator plate 354 and the friction plate 61 is in the forward direction or the reverse direction.

In this way, in the frictional engagement apparatus according to the second modified example of the example embodiment, drag torque generated by lubricating oil in the gap between the friction plate 61 and the separator plate 354 may be reduced over a wide range from a low relative rotation speed of the friction plate 61 and the separator plate 354 to a high relative rotation speed of the friction plate 61 and the separator plate 354 when the friction plates 61, 62, and 63 are disengaged from another plurality of separator plates.

Furthermore, in the second modified example of the example embodiment, the ridge lines 354*ru* of the plurality of concave portions 354*u* that dip inward in the plate thickness direction and the ridge lines 354*rn* of the plurality of convex portions 354*n* that protrude outward in the plate thickness direction, which are formed in the first and second ridge line groups described above, are formed extending generally parallel at predetermined intervals on the edge 354*m* of the separator plate 354. Alternatively, The friction plate may be formed in the same manner.

Incidentally, in the first and second modified examples of the example embodiment, the outer engagement members are separator plates and the inner engagement members are friction plates in the forward clutch 20 of the transaxle 4. Alternatively, however, the outer engagement members and the inner engagement members may belong to a device other than the forward clutch 20. For example, they may be separator plates and friction plates of a reverse brake.

As described above, the invention provides a frictional engagement apparatus that reduces drag torque generated by lubricating oil in a gap between a friction member and an engagement member, over a wide range from a low relative rotation speed of the friction member and the engagement member to a high relative rotation speed of the friction member and the engagement member when these members are not engaged. The invention may be widely used for a friction member such as a friction plate and an engagement member such as a separator plate of a frictional engagement apparatus such as a forward clutch or a reverse brake or the like.

While the invention has been described with reference to example embodiments thereof, it should be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A frictional engagement apparatus comprising:
an outer cylindrical member that is open at one axial end and in which splines are formed on an inner peripheral portion of the outer cylindrical member;
an inner cylindrical member provided coaxially with the outer cylindrical member of which an outer peripheral portion is arranged within the outer cylindrical member, in the radial direction, and splines are formed on the outer peripheral portion of the inner cylindrical member facing the inner peripheral portion of the outer cylindrical member;
a plurality of outer engagement members, each of which has an outer peripheral portion that spline-engages with the inner peripheral portion of the outer cylindrical member, wherein each outer engagement member of the plurality of engagement members is moveable in the axial direction with respect to the outer cylindrical member and rotates together with the outer cylindrical member; and
a plurality of inner engagement members, each of which has an inner peripheral portion that spline-engages with the outer peripheral portion of the inner cylindrical member, wherein each inner engagement member of the plurality of engagement members is moveable in the axial direction with respect to the inner cylindrical member and rotates together with the inner cylindrical member, the inner engagement members being arranged coaxially and alternately with the outer engagement members, each inner engagement member being able to frictionally engage with the outer engagement members adjacent thereto,
wherein an edge of each of the outer engagement members and/or each of the inner engagement members has a plurality of concave portions that dip inward in the plate thickness direction and a plurality of convex portions that protrude outward in the plate thickness direction, each convex portion being arranged between two adjacent concave portions; and ridge lines of the concave portions and the convex portions pass through positions away from a center point of each of the outer engagement members and/or each of the inner engagement members,
a plurality of through holes are formed in the outer cylindrical member so as to correspond to the convex portions, the plurality of through holes penetrating the outer cylindrical member from an inner side of the outer cylindrical member to an outer side thereof, and
the plurality of through holes are adjacent to outer ends of the corresponding concave portions and are each positioned on a forward side of the outer end of the corresponding concave portion with respect to a rotational direction of the outer cylindrical member.

2. The frictional engagement apparatus according to claim 1, wherein each of the ridge lines of the concave portions and the convex portions intersects, at an angle, one of a plurality of radial lines which pass through the center point of the outer engagement member and the inner engagement member and extend radially outward.

3. The frictional engagement apparatus according to claim 2, wherein a first angle between each of the ridge lines of the plurality of convex portions and each corresponding radial line is the same.

4. The frictional engagement apparatus according to claim 3, wherein a second angle between each of the ridge lines of the plurality of concave portions and each corresponding radial line is the same.

5. The frictional engagement apparatus according to claim 4, wherein the first angle and the second angle are equal.

6. The frictional engagement apparatus according to claim 2, wherein an angle between each of the ridge lines of the plurality of concave portions and each corresponding radial line is the same.

7. The frictional engagement apparatus according to claim 1, wherein the ridge lines of the concave portions and the convex portions extend generally parallel at predetermined intervals.

8. The frictional engagement apparatus according to claim 1, wherein the ridge lines of the concave portions and the convex portions are divided into a first group of ridge lines that is made up of ridge lines which extend generally parallel at predetermined intervals, and a second group of ridge lines that is made up of ridge lines which extend generally parallel at predetermined intervals and are orthogonal to the ridge lines of the first group of ridge lines.

* * * * *

UNITED STATES PATENT AND TRADEMARK OFFICE
CERTIFICATE OF CORRECTION

PATENT NO. : 8,286,773 B2
APPLICATION NO. : 12/540666
DATED : October 16, 2012
INVENTOR(S) : Kazuaki Nakamura et al.

It is certified that error appears in the above-identified patent and that said Letters Patent is hereby corrected as shown below:

In the Specification

Col. 2, line 34: replace "not" with --nor--

Col. 9, line 55: replace "fixed sheave 82" with --fixed sheave 81--

Col. 9, line 56: replace "moveable sheave 81" with --moveable sheave 82--

Col. 10, line 52: replace "gear II" with --gear 11--

Signed and Sealed this
Thirteenth Day of May, 2014

Michelle K. Lee
*Deputy Director of the United States Patent and Trademark Office*